W. P. & T. A. HAMMOND.
VALVE FOR PNEUMATIC TIRES.
APPLICATION FILED JAN. 17, 1907.
1,035,185.
Patented Aug. 13, 1912.
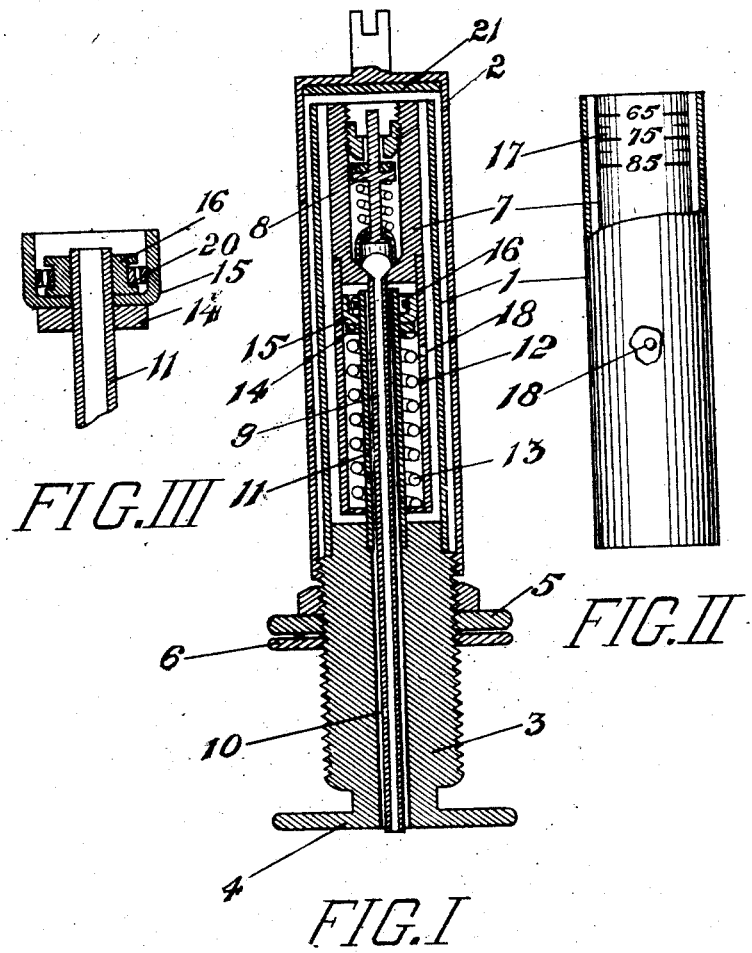

UNITED STATES PATENT OFFICE.

WILLIAM P. HAMMOND, OF NEW YORK, N. Y., AND THEODORE A. HAMMOND, OF PASSAIC, NEW JERSEY.

VALVE FOR PNEUMATIC TIRES.

1,035,185.  Specification of Letters Patent.  Patented Aug. 13, 1912.

Application filed January 17, 1907. Serial No. 352,791.

*To all whom it may concern:*

Be it known that we, WILLIAM P. HAMMOND, a citizen of the United States, and a resident of the city, county, and State of New York, and THEODORE A. HAMMOND, a citizen of the United States, and a resident of the city of Passaic and county of Passaic and State of New Jersey, have invented new and useful Improvements in Valves for Pneumatic Tires; and in order that those skilled in the art may understand, make, and use the same give the following specification thereof.

Our invention relates to valve stems such as are used on pneumatic tires for wheels of vehicles and the object of the invention is to produce a valve stem of simple and reliable construction which shall automatically regulate and determine the air pressure in the tire at the desired degree.

In all valve stems at present generally known and used of which we are aware there are no means provided for determining or regulating the degree of inflation or of the air pressure within the tire, and where this is to be ascertained separate and special devices or apparatus, such as pressure gages, have to be provided. Our invention is intended to obviate the use of these special devices and provide a pressure-regulating or determining device which forms part of the valve stem itself and which is thus in place and always available for securing proper tire inflation conditions; and this without materially changing the form, appearance or dimensions of the valve stem, or interfering with its use in the usual way.

In the accompanying drawing we have illustrated a form of valve stem involving our invention in which:

Figure 1 is a vertical sectional view, Fig. 2 is a view showing the upper portion of the stem with the hood removed, Fig. 3 is a detail view on an enlarged scale.

The valve stem comprises a barrel 1 within which are arranged the working parts of the device. This barrel is enveloped in a hood 2 which is removed when the tire is to be inflated. The lower end 3 of the stem is formed solid and is provided with the usual means, such as a flange 4 and screw collars 5 and 6 for securing the same in the tire.

Within the barrel 1 near the top thereof is a head 7 in which is arranged a check valve 8 of the ordinary kind. From the lower end of the head 7 extends a tube 9 which forms the induct for the air to the tire. In its normal position this induct extends to the lower end of the stem, passing through a bore or channel 10 in the solid lower portion thereof. The bore 10 communicates at its lower end with the interior of the tire and forms an educt for the air therein admitting the air to the lower side of the head 7. It will be seen that the ducts 9 and 10 are concentrically arranged with the latter surrounding the former. The upper portion of the educt 10 above the solid portion 3 of the stem is formed by a sleeve 11 secured at its lower end in said solid portion by soldering or otherwise. A sleeve 12 is also soldered or otherwise suitably secured at its upper end to the head 7 and extends downwardly to the end of the solid portion 3. Between the head 7 and the solid portion 3 is formed a chamber in which is arranged a spring 13 which surrounds sleeve 11 and occupies the annular space between sleeves 11 and 12. This spring is held between a collar 14 on the upper end of sleeve 11 and the inturned lower end of the sleeve 12 so that the said spring will be put under compression between said inturned lower end of sleeve 12 and collar 14 when the head 7 moves upward as will be hereinafter more clearly described. A washer 15 of leather or other suitable packing material is secured at the upper end of sleeve 11 between collar 14 and a collar 16. This washer is to prevent leakage or escape of air past or between it and the inner wall of sleeve 12. An expansion spring 20 is provided to keep the washer 15 pressed against the walls of the sleeve to insure an air tight contact and this is further insured automatically by the air pressure on said washer which is of somewhat an inverted umbrella type as shown in Fig. 3.

The upper end of head 7 is marked with a scale or graduation 17 ((see Fig. 2) which indicates the degree of air pressure within the tire as hereinafter explained. In the sleeve 12 at a point determined by the desired or proper pressure to which the tire is to be inflated, is a relief or blowoff aperture 18.

From the foregoing description the operation of the device will be readily understood. The tire is inflated in the usual manner by removing hood 2 and attaching the pump or other inflating means to the stem. As the pressure in the tire rises during inflation, and educt 10 being opened to the interior of the tire, air will issue through said educt and the pressure will be exerted upon the head 7, which operates as a pressure head. This causes the head 7 to rise against the action of a spring 13. As head 7 rises the graduations 17 thereon will appear above the edge of barrel 1 and the degree of pressure in the tire will be thus indicated. As head 7 continues to rise aperture 18 in sleeve 12 will rise above the washer 15 and permit the air to escape through said aperture into barrel 1 whence it finds escape at the top of the stem. When the hood 2 is in place there is no leakage since all tendency thereto is prevented by the packing or seat 21 of leather or rubber or other suitable material in the head of said hood. The pressure on the head 7 will be thus relieved by the escape of air through said aperture 18, and head 7 will descend until said aperture 18 falls below the washer 15. This not only prevents excessive pressure being developed in the tire, but will limit the pressure therein to the proper predetermined degree suited for a given tire.

It will be noted that the head 7 may be revolved to bring the scale 17 to view should it happen that in affixing the valve stem to a tire that the scale should be on the inside of the wheel.

As we have illustrated but one specific embodiment of our said invention, we would have it distinctly understood that we are not to be limited to the one specific construction shown, as the structural features thereof may, and can be altered or changed without departing from the scope or tenor of our following claims.

Having thus described our invention what we claim and desire to secure by Letters Patent is:

1. The combination of movably mounted valve mechanism, comprising a valve and its seat, the valve being movable to and from its seat, and pressure-indicating means for showing varying pressures, operated by the movement of said mechanism.

2. The combination of movably mounted valve mechanism, comprising a valve and its seat, the valve being movable to and from its seat, means for placing said mechanism in communication with the pressure-containing structure, at all points in the movement of said mechanism, and indicating means for showing varying pressures, operated by the movement of said mechanism.

3. The combination of a stem or casing adapted to be attached to a fluid-pressure receiving structure, a valve mechanism movably mounted in said casing, comprising a valve and its seat, to and from which the valve is movable, and indicating means for showing varying pressures within said structure, operated by the movement of said mechanism.

4. The combination of a stem or casing adapted to be attached to a fluid-pressure receiving structure, an inwardly opening valve mechanism movably mounted in said casing, an extensible and contractible connection between said valve mechanism and the interior of the pressure receiving structure, and indicating means operated by said valve mechanism.

5. The combination of movably mounted valve mechanism, comprising a valve and its seat, the valve being movable to and from its seat, pressure indicating means for showing varying pressures operated by the movement of said mechanism, and automatic means for relieving excess pressure.

6. The combination of a stem or casing adapted to be attached to a fluid-pressure receiving structure, and inwardly opening valve mechanism movably mounted in said casing, an extensible and contractible connection between said valve mechanism and the interior of the pressure-receiving structure, indicating means operated by said valve mechanism, and a spring opposing the movement of the indicating means by pressure on the valve mechanism.

7. The combination, with a pneumatic tire, of a pressure indicator comprising a tube or casing attached to the tire for showing varying pressures within the tire, and a member slidably connected with said tube or casing having a pressure-receiving part in communication with the interior of the tire.

8. The combination of movably mounted valve mechanism, comprising a valve and its seat, to and from which the valve is movable, pressure indicating means operated by the movement of such mechanism, a spring yieldingly opposing the movement of the indicating means by pressure, and means to positively prevent movement of the indicator by pressure on said mechanism.

9. The combination of a movably mounted valve mechanism, comprising a valve and its seat, to and from which the valve is movable, pressure indicating means, operated by the movement of such mechanism, a spring yieldingly opposing the movement of the indicating means by pressure, and a screw cap adapted to engage the valve mechanism and hold it from movement by pressure.

10. The combination of a pressure indicator having a spring acting yieldingly in opposition to pressure to move the indicator, and means to positively hold the indicator from movement by such pressure.

11. The combination of movably mounted valve mechanism comprising a valve and its seat, to and from which the valve is movable, means for placing said mechanism in communication with a pressure containing structure, means operated by the movement of said mechanism for preventing an excess of pressure in the containing structure, a spring opposing the movement of the mechanism by pressure, and means to positively prevent movement of the mechanism by pressure thereon.

12. The combination of movably mounted valve mechanism comprising a valve and its seat to and from which the valve is movable, means for placing said mechanism in communication with a pressure containing structure, means operated by the movement of said mechanism for preventing an excess of pressure in the containing structure, a spring opposing the movement of the mechanism by pressure, and a screw-cap adapted to engage the valve mechanism and hold it from movement by pressure.

13. The combination with a pneumatic tire, of pressure indicating means comprising two telescoping members, means operably associated with said telescoping members to form an air-tight connection therebetween during the movement of one of the members, said means being acted upon by pressure from within the tire tending to produce telescopic movement of the members, means opposing such telescopic movement of the members, and means operated by the movement of said members to prevent an excess pressure within the tire.

14. The combination with a pneumatic tire of pressure indicating means comprising two telescoping members, a valve mechanism comprising a valve and its seat, to and from which it is movable, mounted in one of the members, means operably associated with said telescoping members to form an air tight connection therebetween, said means being acted upon by pressure from within the tire tending to produce telescopic movement of the members, means opposing such telescopic movement of the members, and means operated by the movement of said members to prevent an excess pressure within the tire.

15. The combination with a pneumatic tire of valve mechanism therefor, comprising two telescoping members, means for securing one of said telescoping members to a tire, an inwardly opening valve in the other of said telescoping members, means operably associated with said telescoping members to form an air tight connection therebetween, one of the telescoping members provided with a chamber adapted to communicate with the interior of the tire, the pressure within the chamber tending to produce sliding movement of the telescoping members, a spring opposing the said sliding movement of the telescoping members, and means whereby the pressure may be indicated by the movement of the telescoping members.

16. The combination of two telescoping members; a check valve mechanism comprising a valve and its seat to and from which it is movable, said mechanism being removably mounted within one of said members; means for placing said members in communication with the interior of a pneumatic tire; means operably associated with said telescoping members to normally form an air-tight connection therebetween during the movement of the members; said means being acted upon by pressure from within the tire tending to produce telescopic movement of the member; means opposing such movement; and means controlled by the telescopic movement of the members whereby the pressure may be indicated by blowing off or relieving excess pressure from within the tire.

WILLIAM P. HAMMOND.
THEODORE A. HAMMOND.

Witnesses:
J. G. BISHOP,
P. F. SONNEK.

DISCLAIMER.

1,035,185.—*William P. Hammond*, New York, N. Y., and *Theodore A. Hammond*, Passaic, N. J. VALVE FOR PNEUMATIC TIRES. Patent dated August 13, 1912. Disclaimer filed July 14, 1922, by the assignee, *A. Schrader's Son, Incorporated*.

Hereby disclaim from the scope of each and all of the claims of said Patent No. 1,035,185, (1) any combination which does not constitute a "valve for pneumatic tires" as such term is understood in the art, and was so understood at the date of said patent, that is to say, a valve or valve stem constructed and adapted for connection with a pump or other inflating means for the purpose of inflating the tire, and (2) any combination of elements in which the "valve mechanism" set forth in the claims does not comprise the inwardly-opening check valve and seat of such pneumatic tire valve or valve stem.

[*Official Gazette July 25, 1922.*]